Dec. 3, 1963  J. MOZIEK  3,112,525
APPARATUS FOR EXTRUDING THERMOPLASTIC MATERIAL
Filed Sept. 20, 1961  5 Sheets-Sheet 1
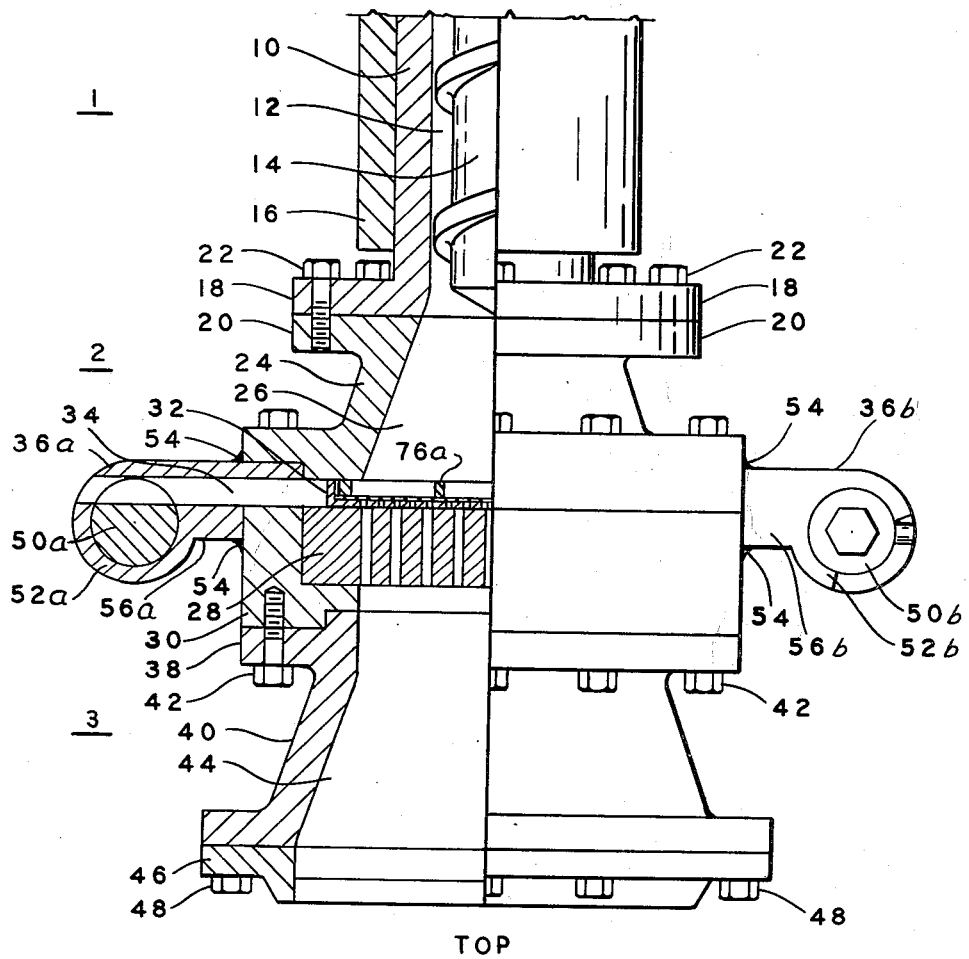
Fig. I
JOHN MOZIEK INVENTOR.
BY Arthur E. Hoffman
AGENT

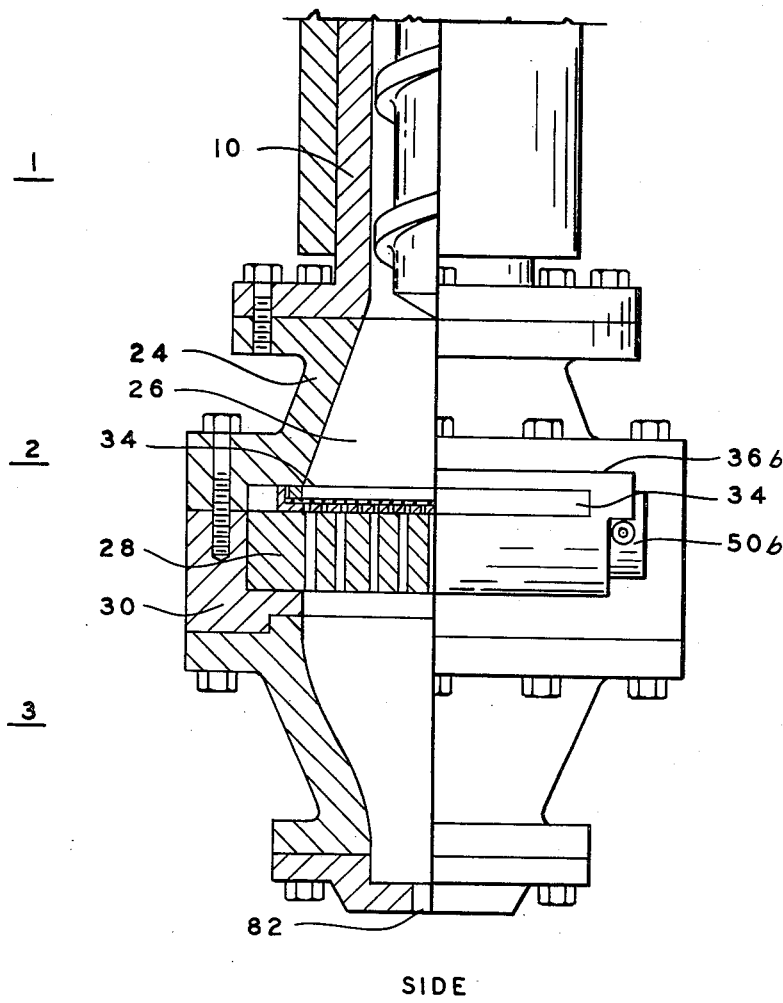
Fig. II

Dec. 3, 1963  J. MOZIEK  3,112,525
APPARATUS FOR EXTRUDING THERMOPLASTIC MATERIAL
Filed Sept. 20, 1961  5 Sheets-Sheet 3
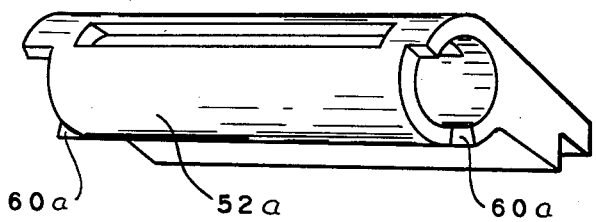
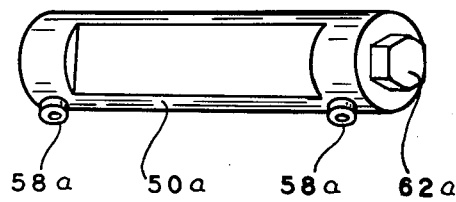
Fig. III
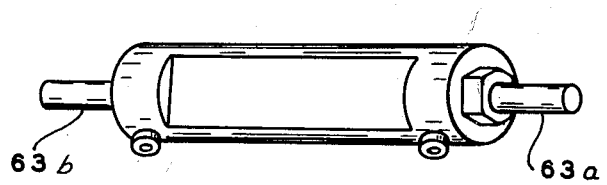
Fig. IV
JOHN MOZIEK  INVENTOR.
BY Arthur E. Hoffman
AGENT

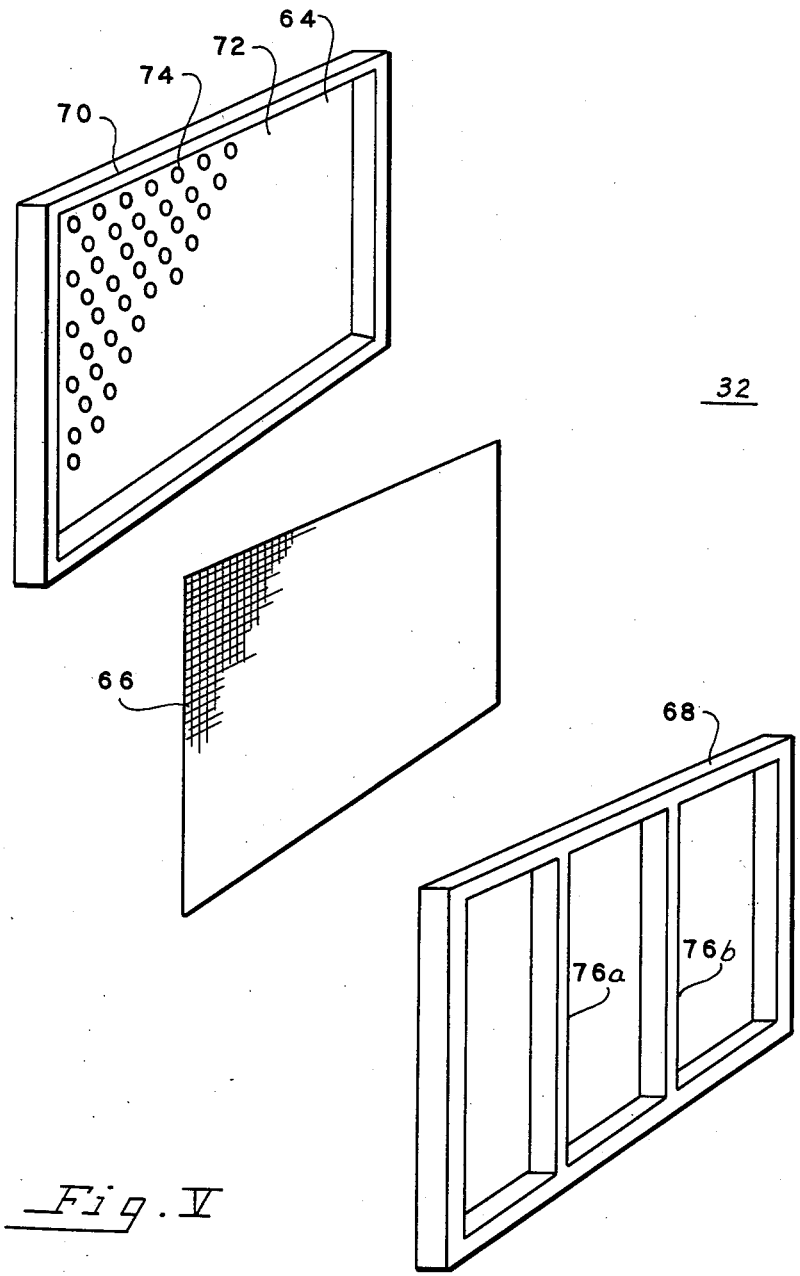

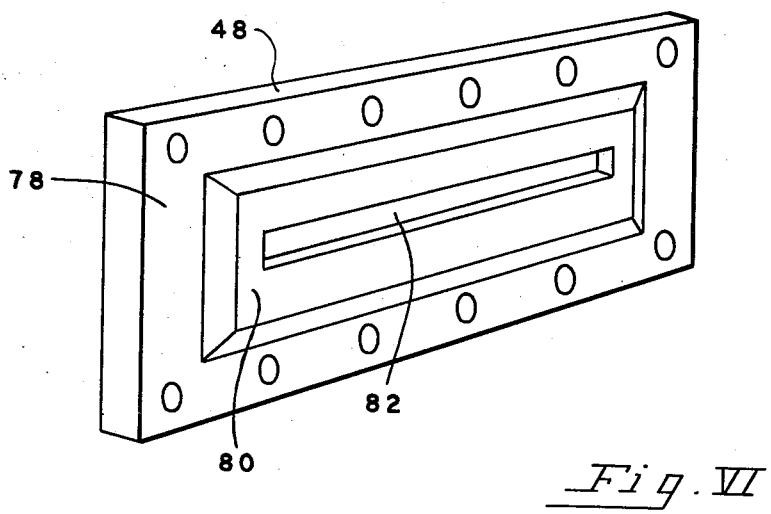
Fig. VI

United States Patent Office 3,112,525
Patented Dec. 3, 1963

3,112,525
APPARATUS FOR EXTRUDING THERMOPLASTIC MATERIAL
John Moziek, South Hadley Falls, Mass., assignor to Monsanto Chemical Company, St. Louis, Mo., a corporation of Delaware
Filed Sept. 20, 1961, Ser. No. 139,477
4 Claims. (Cl. 18—12)

This invention relates to apparatus for the continuous extrusion of thermoplastic materials. More particularly, this invention relates to an extruder having mounted thereon a fixed breaker-plate operated in conjunction with a slidable cartridge assembly that can be replaced without interrupting continuous extrusion operations.

Conventional extruders for thermoplastic materials comprise, generally, an elongated hollow casing provided with heating means and a driven rotatable screw mounted in the casing to force thermoplastic material therethrough. The discharge end of the casing is normally closed with a separate unit or "head" that is removably fixed to the body of the casing. A die is fixed to the head for shaping the thermoplastic material.

In operation, the thermoplastic material is usually fed to the extruder in a solid granular condition alone or in physical admixture with plasticizers, colorants, fillers, etc. As the thermoplastic material is forced through the casing by the screw it is heated to a plastic condition and, while plastic, is colloided and blended with such additives as may be present in order to form a homogeneous composition.

It is common practice to mount a breaker-plate assembly intermediate the screw and the die in order to build up back pressure in the casing and in order to remove impurities from the thermoplastic material being extruded. A breaker-plate normally comprises a metal plate provided with a plurality of openings through which the thermoplastic material flows. The size of the openings will determine the resistance to flow and hence, the amount of back pressure that is built up in the casing. When screens are used, back pressure can be controlled with reasonable accuracy by varying the number of screens, the mesh of the screens or both. Such screens serve an additional function in removing impurities from the thermoplastic material being extruded. The impurities are retained on the screens however and this necessitates rather frequent replacement of clogged screens.

Because of the high pressures generated within the casing, the conventional practice has been to mount the breaker-plate assembly in the interior of the extruder in a recess milled in the inner surface of the casing or head. With this construction it is necessary to interrupt extrusion operations and remove the head in order to gain access to the interior of the extruder to install or replace a breaker-plate assembly. When continuous extrusion operations are interrupted, thermoplastic material in the casing is frequently overheated and decomposed. As a result, it is preferable to avoid the interruption of continuous extrusion operations whenever possible.

A breaker-plate assembly designed for installation or replacement without interrupting continuous extrusion operations is shown and described in U.S. Patent 2,771,636. Although this system has advantages over the more conventional modes of practice, there are several problems associated with its performance. In particular, the major problem has been excessive leakage during normal running and especially during screen changes which result in flow interruptions and extruder stoppages. In addition, the rather heavy and bulky breaker-plate assembly tends to make cleaning difficult and lengthy and requires high power equipment to move or change the breaker-plate assembly. Finally, partial disassembly of the unit, i.e., removal of the end plugs, is required before a change can be made.

Accordingly, an object of the present invention is the provision of an extruder for thermoplastic materials including a fixed breaker-plate operated in conjunction with a slidable cartridge assembly that can be installed or replaced without interrupting continuous extrusion operations.

Another object is the provision of an extruder for thermoplastic materials including a fixed breaker-plate operated in conjunction with slidable cartridge assembly that can be removed and replaced by another slidable cartridge assembly of similar construction without interrupting continuous extrusion operations.

A further object is the provision of an extruder for thermoplastic materials including a fixed breaker-plate operated in conjunction with a slidable cartridge assembly and means for minimizing leakage of said thermoplastic materials during normal operation and particularly during screen changes without interrupting continuous extrusion operations.

The manner in which these and other objects are attained will be apparent from the following description and the accompanying drawings illustrating a preferred embodiment of the invention wherein:

FIG. I is a top plan view, partly in section showing a preferred fixed breaker-plate and a slidable cartridge assembly connected to the discharge end of an extruder;

FIG. II is a side view, partly in section showing the fixed breaker-plate and slidable cartridge assembly connected to the discharge end of the extruder;

FIG. III is an exploded perspective view of the preferred valve means used for sealing the ends of the cartridge slot;

FIG. IV is an exploded perspective view of an alternate construction of a valve core for cooling the valve means;

FIG. V is an exploded perspective view of the slidable cartridge assembly shown in FIG. I; and FIG. VI is an exploded perspective view of the die discharge section.

Referring in detail to the figures of the drawings and more specifically to FIG. I, there is schematically shown the discharge end of the extruder 1, the fixed breaker-plate and slidable cartridge assembly 2, and a die assembly 3. The discharge end of the extruder 1 includes a casing 10 defining a bore 12 of circular cross-section in which a screw 14 of any suitable construction is rotatably mounted. Any suitable means is provided for heating thermoplastic material in the bore 12 such as, for example, an insulated electric heating coil 16 surrounding the casing 10. The fixed breaker-plate and slidable cartridge assembly 2, is fixed to the discharge end of the extruder by any suitable means, this being conveniently accomplished by providing a flange 18, on the end of casing 10 to which a similar flange 20 is fixed by means of a plurality of screws or bolts 22. The fixed breaker-plate and slidable cartridge assembly 2 includes a casing 24 defining a chamber 26, a fixed breaker-plate 28, having a central perforate cross-section coextensive with the abutting cross-section of chamber 26, securely mounted in a casing frame 30, a slidable cartridge assembly 32 positioned in slot 34, and valve means 36a and 36b for opening and closing the ends of slot 34. The die assembly 3, is fixed to the discharge end of casing frame 30 by any suitable means, this being conveniently accomplished by providing a flange 38 on die casing 40 which is fixed to casing-frame 30 by means of a plurality of screws or bolts 42. The die assembly includes die casing 40 defining a chamber 44 and a die discharge section 46 fixed to die casing 40 by means of a plurality of screws or bolts 48.

In accordance with the present invention, a fixed breaker-plate and slidable cartridge assembly 2 is used for building up back pressure in the chamber 26 and the bore 12 and for screening impurities and uncolloided agglomerates from the thermoplastic material intermediate the end of the screw 14 and the die discharge section 46. In the illustrated embodiment of the invention (see both FIGS. I and II), chamber 26 is shown to be of progressively changing circular cross-section being of minimum cross-section at the plane of abutment with the casing 10 and of maximum cross-section at the plane of abutment with the fixed breaker-plate 28. However, the cross-section of the chamber 26 at the plane of abutment with the fixed breaker-plate 28 can be of varied shape such as square, rectangular or the like and can be greater or less in area than the cross-section of the chamber 26 at the plane of abutment with the casing 10. The fixed breaker-plate 28 as shown in FIG. I and FIG. II is of substantially square cross-section, with a central perforate portion coextensive with the abutting cross-section of chamber 26. However, the cross-sectional configuration of the fixed breaker-plate 28 may be varied to any desired shape as long as the limiting boundaries of said configuration completely encompass the limiting boundaries of the cross-sectional area of the slidable cartridge assembly at the plane of abutment with the fixed breaker-plate 28.

The slot 34 should extend completely through the side of the extruder and valve means 36a and 36b, and should be of uniform cross-section throughout and should perpendicularly intersect the entire peripheral edge of the chamber 26 at the zone of intersection therewith. The slot 34 can be of any desired cross-sectional shape, such as circular, elliptical, square, rectangular, etc. In the illustrated embodiment of the invention, as shown in FIGS. I and II, the slot 34 is milled in the discharge end of the casing 24 and is of rectangular cross-section. In this showing, the slot 34 is centered with respect to the chamber 26 and perpendicularly intersects the entire peripheral edge thereof, being wide enough to provide a margin surrounding the chamber 26.

Valve means 36a and 36b open or seal off the ends of slot 34 by the rotation of the solid cores 50a and 50b within tubes 52a and 52b respectively. The valve means 36a and 36b may be mounted on the sides of the extruder by any suitable means, this being conveniently accomplished by recessing and welding at the plurality of corner edges 54, the connecting arms 56a and 56b, of tubes 52a and 52b respectively, to the sides of the extruder. A tube member 52a and a core 50a are shown separately in FIG. III. As may be seen in FIG. III tube member 52a is slotted to permit passage of the slidable cartridge assembly 32. The core or valve sealing means 50a is milled along the side of its mid-portion to substantially the depth and width of slot 34 shown in FIG. II. When the core 50a is fitted into tube 52a, maintaining the perspective relationship shown in FIG. III, the valve will be in sealed position with guide screws 58a—58a within the cutaway upper and lower annular grooves of tube 52a abutting the vertical groove surfaces 60a—60a. Rotation of core 50a by turning the hexagonal cup 62a clockwise 90° such that guide screws 58a—58a abut the opposite vertical surfaces of upper and lower annular grooves, will place the valve in open position such that the valve means 36a will constitute an extension of the slot 34 as shown in FIG. I. The purpose of the valve means 36a and 36b is to prevent excessive leakage during extrusion of thermoplastic material, particularly on screen changes and to eliminate partial disassembly of the unit before a screen change could be made. In the illustrated embodiment, the tube and core members are cylindrical. However, these members could be conical, spherical, etc. The hexagonal turning cap 62a can be of any desired shape and can be turned manually or automatically.

The tendency of most thermoplastic materials to leak past the valve means is generally dependent on the fluid viscosity of the thermoplastic material at the temperature of extrusion. For materials of low fluid viscosity, it has been found that leakage can be further reduced by supplemental cooling of the valves. This may be most conveniently done by hollowing or jacketing portions of the valve means to permit circulation of a cooling medium. One embodiment for supplementally cooling of valve means 36a and 36b is shown in FIG. IV wherein a valve core has been hollowed out and equipped with intake and discharge nozzles 63a and 63b respectively for the circulation of a cooling medium. If supplemental cooling is desired, this alternate valve core could be substituted for the valve core 50a shown in FIG. III.

Referring again to FIGS. I and II the slidable cartridge assembly 32 should have the same cross-sectional configuration as the slot 34. The overall length of the slidable cartridge assembly 32 should be greater than the width of chamber 26 and less than the width of the fixed breaker-plate 28 in the direction of the slot such that the marginal end portions of said cartridge are provided for engagement with the slot wall of the chamber casing 24 and the fixed breaker-plate 28. Since the slidable cartridge assembly 32 has the same cross-sectional configuration as the slot 34, when the slot 34 is of a width greater than the width of the chamber 26 as shown in the drawings the width of the slidable cartridge assembly 32 will likewise be greater and the entire marginal portion thereof will completely surround the chamber 26. The portion of the slidable cartridge assembly 32 intersecting the chamber 26 should be perforated to permit the passage of thermoplastic material therethrough.

As shown more clearly in FIG. V, a preferred embodiment of the slidable cartridge assembly 32 for use in the illustrated extruder comprises a framed perforated holder 64, a screen 66 and a ribbed retainer 68. The framed perforated holder 64 is of a special light-weight construction and comprises an imperforate marginal portion 70 and a perforate portion 72 provided with openings 74. The provision of the marginal portion 70 is designed to substantially reduce thermoplastic material from flowing through the slot 34 during continuous extrusion operation. The perforate portion 72 is of a relatively thin gauge construction and is designed to resist the pressures of extrusion by deriving its basic support from a heavier fixed breaker-plate 28 (see FIG. I) positioned in the extruder immediately downstream of the slidable cartridge assembly 32. The rather narrow and lightweight construction of the slidable cartridge assembly 32 is advantageous for cleaning and considerably reduces the power of the equipment required to change or replace cartridge assemblies. A special feature of the present invention is the provision of a ribbed retainer 68 designed to substantially reduce thermoplastic material from flowing through the slot 34 during screen changes. More specifically, during movement of the slidable cartridge assembly 32 (see FIG. I) ribs 76a and 76b serve to block or prevent severe leakage of the extruded thermoplastic material through slot 34, thereby eliminating loss of extrusion pressures which would result in plastic film breakage and extruder shutdown.

Referring again to FIG. V, the slidable cartridge assembly 32 may be used without the screen 66, in which case the build-up of back pressure will be determined by the size of the openings therein. However, it is preferable to use one or more screens in conjunction with the cartridge 32 in order to more easily regulate back pressure and more efficiently screen impurities from the thermoplastic material being extruded. Only one screen 66 has been shown but a plurality of such screens could be used if desired. The ribbed retainer 68 is also used to fix the screen 66 in place; the ribbed retainer 68 snugly engaging the internal edge of the marginal portion 70.

The illustrated die assembly 3 shown in FIGS. I and II comprises a die casing 40 defining a chamber 44 and a die discharge section 46 fixed to die casing 40 by means of a plurality of screws or bolts 48. The chamber 44 is of progressively changing cross-section, being of circular cross-section at the plane of abutment with the fixed breaker-plate casing frame 30 and of rectangular cross-section at the plane of abutment with the die discharge section 46. In accordance with this construction, the die casing 40, in effect constitutes an extension of the fixed breaker-plate casing frame 30 and serves to adapt the cross-section at the plane of abutment with the fixed breaker-plate casing frame 30 to the cross-section of the die discharge section 46. Consequently, the shape of the casing 40 will depend primarily on the cross-sectional configurations of both the fixed breaker-plate casing frame 30 and the die discharge section 46. The illustrated die discharge section as shown more clearly in FIG. VI comprises a flanged base portion 78 and a discharge portion 80 provided with a rectangular opening 82 for the continuous extrusion of thermoplastic sheet material. The dimensions of the rectangular opening 82 will vary according to the desired thickness and width of the extruded thermoplastic sheet. If desired, the discharge portion 80 may be provided with a plurality of rectangular openings for the continuous extrusion of strands of thermoplastic material. However, it is not intended to limit the scope of this invention by the openings provided in the discharge portion of the die as the openings can be of any desired cross-sectional shape, such as circular elliptical, square, rectangular, etc.

*Operation*

Prior to the commencement of extrusion operations, the slidable cartridge assembly 32 is positioned in the slot 34 and centered with respect to the chamber 26 through one of the now open valve means 36a and 36b by means of a retractable ram, not shown. After the ram is retracted, valve means 36a and 36b are closed by rotating cores 50a and 50b 90° counter-clockwise and clockwise respectively. Guide screws 58a and 58b, the latter not shown, will restrict the movement of the cores 50a and 50b to a fully closed or fully open position. The heating coil 16 is then energized and the screw 14 is rotated. When the desired temperature has been reached, thermoplastic material is continuously fed to the bore 12 of the extruder by any suitable means (not shown) and is forced therethrough by means of the screw 14. While in the bore 12, the thermoplastic material is heated to a plastic condition, colloided, and blended with such additives as may be present. The colloided thermoplastic material is then forced by the pressures developed by the screw 14 first through the cartridge assembly 32 and then through the fixed breaker-plate 28. As has been indicated, the resistance offered by the cartridge assembly 32 will increase the back pressure in the chamber 26 and the bore 12. After passage of the thermoplastic material through the cartridge assembly 32, the fixed breaker-plate 28 and the die chamber 44, the thermoplastic material is then forced through the openings 82 of the die discharge section 46 forming a continuous extruded sheet of plastic.

Impurities and uncolloided agglomerates of thermoplastic material will be retained by the screen 66 and as a result, slidable cartridge assembly 32 may become clogged as extrusion operations continue. When this happens it is necessary that the clogged slidable cartridge assembly 32 be replaced. In accordance with the present invention, this is done without interrupting continuous extrusion operations.

While thermoplastic material is being extruded, the valve means 36a and 36b are opened by turning the valve cores 50a and 50b 90° clockwise and counter-clockwise respectively. A fresh cartridge assembly (not shown) of the same construction as the illustrated assembly 32 is then positioned within one end of the slot 34 and brought into abutting contact with one end of the clogged slidable cartridge assembly 32. Force is then applied to the fresh assembly by any suitable means (not shown), such as a retractable ram, rod or similar device in order to progressively push the fresh assembly into the slot 34 and force the clogged assembly 32 beyond the chamber 26 where it can be readily pulled out the other end of the slot 34 by manual or automatic means. It is preferable that the replacement operation be performed at a rate such that each increment of the fresh assembly is heated to the temperature of the thermoplastic material within the chamber 26 before being forced therein. However, since the slidable cartridge assembly 32 is of a lightweight construction, its support strength being derived from the mass of the fixed breaker-plate 28, heating of the fresh assembly 32 will occur fairly rapidly, thereby expediting the replacement operation. During the replacement operation, there will be substantially no flow of thermoplastic material out of the ends of the slot 34 due to the sealing effect of the special ribbed retainer 68 provided as a part of the slidable cartridge assembly 32. When the fresh assembly has been properly centered in the slot 34, by any suitable means (not shown), such as a retractable ram, rod or similar device, valve means 36a and 36b are again closed as described above.

Occasionally, a batch of off-grade material may be fed to the extruder. Since the extruder will have been set to extrude in-grade material, it will frequently happen that the off-grade material will be improperly colloided. Generally, such material must be discarded as it is impractical to interrupt continuous extrusion operations in order to modify the design of the extruder. However, in accordance with the present invention, it is frequently possible to quickly and satisfactorily remedy this situation by either increasing or decreasing back pressure, as the case may be, without interrupting continuous extrusion operations. In order to do this, a special slidable cartridge assembly designed to effect the desired change in back pressure is prepared by mounting within a fresh cartridge assembly a screen of different mesh size, a different number of screens, or both. The standard cartridge assembly 32 is then replaced by the special cartridge assembly in the indicated manner without interrupting extrusion operations. As a result of the change in cartridge assemblies, the off-grade material can be satisfactorily colloided and need not be discarded. When the off-grade material has passed through the extruder and the extrusion of the standard formulation is resumed, the special cartridge assembly is replaced by the standard cartridge assembly for the regular formulation.

The above descriptions and particularly the drawings are set forth for purpose of illustration only. Many variations and modifications thereof will be obvious to those skilled in the art and can be made without departing from the spirit and scope of the invention herein described.

What is claimed is:

1. In combination in an extruder, an elongated casing defining a lengthwise bore therein, a rotatable screw mounted within said bore, an immovable transverse fixed breaker-plate in the elongated casing between the end of the screw and the discharge end of the casing, said breaker-plate having a central perforate portion whose cross-sectional area is substantially coextensive with the bore, a slot of uniform cross-section perpendicularly intersecting the entire peripheral edge of the bore, said slot being located immediately upstream and parallel to the fixed breaker-plate, and a slidable cartridge assembly positioned in said slot; said cartridge assembly having an imperforate marginal frame sealably fitting said slot and a central perforate portion whose cross-sectional area is substantially coextensive with the bore and a plurality of ribs perpendicular to the slot, the width of said ribs in a direction of flow being substantially equal to the width of the slot.

2. In combination in an extruder, an elongated casing defining a lengthwise bore therein, a rotatable screw mounted within said bore, an immovable transverse fixed breaker-plate in the elongated casing between the end of the screw and the discharge end of the casing, said breaker-plate having a central perforate portion whose cross-sectional area is substantially coextensive with the bore, a slot of uniform cross-section perpendicularly intersecting the entire peripheral edge of the bore, said slot being located immediately upstream and parallel to the fixed breaker-plate, a pair of valve means associated with and sealing the ends of the slot and a slidable cartridge assembly positioned in said slot; said cartridge assembly having an imperforate marginal frame sealably fitting said slot and a central perforate portion whose cross-sectional area is substantially coextensive with the bore, and a plurality of ribs perpendicular to said slot, the width of said ribs in the direction of flow being substantially equal to the width of the slot.

3. The combination according to claim 2 wherein the pair of valve means are supplementally cooled.

4. An apparatus, adapted for mounting on the discharge opening of an extruder, for controlling extruder back pressures and for improving the quality of extruded thermoplastic materials comprising, in combination, an immovable fixed transverse breaker-plate having a central perforate portion whose cross-sectional area is substantially coextensive with said discharge opening, a slot of uniform cross-section perpendicularly intersecting the entire peripheral edge of said discharge opening, said slot being located immediately up-stream and parallel to the fixed breaker-plate, and a cartridge assembly slidably mounted in said slot, the length of the cartridge assembly being less than that of the slot, but sufficient to completely intersect the peripheral edge of said discharge opening, said cartridge assembly having an imperforate marginal and a central perforate portion whose cross-sectional area is substantially coextensive with said discharge opening and a plurality of ribs perpendicular to and sealably fitting said slot.

References Cited in the file of this patent

UNITED STATES PATENTS

| | | |
|---|---|---|
| 692,813 | Cowen | Feb. 6, 1900 |
| 1,346,158 | Bailey | July 13, 1920 |
| 2,405,077 | Von der Heide | July 30, 1946 |
| 2,771,636 | McIntosh et al. | Nov. 27, 1956 |
| 2,838,084 | Samler | June 10, 1958 |